United States Patent
Bai et al.

(10) Patent No.: US 11,356,166 B2
(45) Date of Patent: Jun. 7, 2022

(54) APPARATUS AND METHODS FOR EARLY TERMINATION OF BEAM FAILURE DETECTION FOR A MULTI-PANEL UE

(71) Applicant: QUALCOMM Incorporated, San Diego, CA (US)

(72) Inventors: Tianyang Bai, Bridgewater, NJ (US); Vasanthan Raghavan, West Windsor Township, NJ (US); Jung Ho Ryu, Fort Lee, NJ (US); Kiran Venugopal, Raritan, NJ (US); Juergen Cezanne, Ocean Township, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 16/805,443

(22) Filed: Feb. 28, 2020

(65) Prior Publication Data
US 2020/0280360 A1 Sep. 3, 2020

Related U.S. Application Data

(60) Provisional application No. 62/812,742, filed on Mar. 1, 2019.

(51) Int. Cl.
*H04B 7/06* (2006.01)
*H04B 7/08* (2006.01)
(Continued)

(52) U.S. Cl.
CPC ........... *H04B 7/0695* (2013.01); *H04B 7/088* (2013.01); *H04W 16/28* (2013.01); *H04W 24/08* (2013.01); *H04W 72/046* (2013.01); *H04W 76/19* (2018.02)

(58) Field of Classification Search
CPC ..... H04B 7/0695; H04B 7/088; H04W 7/088; H04W 72/046; H04W 24/08; H04W 74/19; H04W 16/28; H04W 48/14; H04W 24/04
See application file for complete search history.

(56) References Cited

U.S. PATENT DOCUMENTS

2018/0279284 A1 9/2018 Wang et al.
2018/0302889 A1* 10/2018 Guo ..................... H04B 7/0617
(Continued)

FOREIGN PATENT DOCUMENTS

WO 2018204255 A1 11/2018

OTHER PUBLICATIONS

International Search Report and Written Opinion—PCT/US2020/020518—ISA/EPO—dated Jun. 17, 2020.
(Continued)

*Primary Examiner* — Peter P Chau
(74) *Attorney, Agent, or Firm* — Seyfarth Shaw LLP

(57) ABSTRACT

A beam failure caused by an event initiated by the UE such as folding of the UE or shutting down of a UE antenna penal may be predictable. Accordingly, the UE may declare a beam failure detection (BFD) without going through a potentially long detection procedure. Disclosed herein are apparatus and methods for detecting beam failure and terminating BFD earlier than the current DFD process would have. The method may include identifying a beam failure (BF) event at the UE that impacts at least one beam pair link (BPL) and communicating a request to an associated base station to stop communicating on an impacted beam pair link, without going through an entire BFD process.

16 Claims, 13 Drawing Sheets

(51) Int. Cl.
*H04W 72/04* (2009.01)
*H04W 24/08* (2009.01)
*H04W 76/19* (2018.01)
*H04W 16/28* (2009.01)

(56) References Cited

U.S. PATENT DOCUMENTS

| | | | |
|---|---|---|---|
| 2019/0150133 A1* | 5/2019 | Li | H04W 72/0413 |
| | | | 375/224 |
| 2019/0159100 A1* | 5/2019 | Liou | H04W 72/042 |
| 2019/0261344 A1* | 8/2019 | Grant | H04B 7/0695 |
| 2020/0067590 A1* | 2/2020 | Wang | H04B 7/0632 |
| 2020/0178134 A1* | 6/2020 | Yang | H04W 36/305 |

OTHER PUBLICATIONS

VIVO: "Discussion on Beam Failure Recovery", 3GPP TSG RAN WG1 Meeting #90bis, 3rd Generation Partnership Project (3GPP), Prague, CZ; Oct. 9-13, 2017, XP051340661, Retrieved from the Internet: URL:http://www.3gpp.org/ftp/Meetings_3GPP_SYNC/RAN1/Docs/ [retrieved on Oct. 8, 2017].

* cited by examiner

APPARATUS AND METHODS FOR EARLY TERMINATION OF BEAM FAILURE DETECTION FOR A MULTI-PANEL UE

CROSS-REFERENCE TO RELATED APPLICATION

This application claims the benefit of U.S. Provisional Application Ser. No. 62/812,742, entitled "APPARATUS AND METHODS FOR EARLY TERMINATION OF BEAM FAILURE DETECTION FOR A MULTI-PANEL UE", filed on Mar. 1, 2019, the entire content of which is expressly incorporated by reference herein in its entirety.

BACKGROUND

Field

The present disclosure relates generally to communication systems, and more particularly, to early termination of beam failure detection (BFD) for a multi-panel user equipment (UE).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

New display technologies make available flexible and foldable UEs and also raise new issues for beam management for those UEs with multi-antenna arrays or multiple antenna panels. When a multi-panel UE is folded, beam configurations of the UE may be changed and availability of a beam pair link (BPL) currently in service may be impacted. The existing beam failure detection mechanism may not be effective for detecting and managing a beam failure (BF) caused by folding of the UE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

New display technologies make available flexible and foldable UEs and also raise new issues for beam management for those UEs with multi-antenna arrays or multiple antenna panels. When such a UE is folded, beam configurations of the UE may be changed because some antenna panels may become unavailable. The existing beam failure detection mechanism may not be effective for detecting and managing beam failures caused by folding of the UE. The current mechanism may include measuring a BPL quality via measuring a reference signal (RS)'s Reference Signal Received Power (RSRP), Reference Signal Received Quality (RSRQ) and/or signal to interference-noise ratio (SNR) may go through several stages to ensure a beam failure event is not a false alarm. Current beam failure detection mechanism is designed for link failure caused by external events such as signaling fading, UE mobility, or dynamic blockage. These external events are not controllable or predictable from the UE's perspective.

On the other hand, a beam failure caused by an event initiated by the UE such as folding of the UE may be predictable. For example, when a multi-panel UE is being folded, the UE may detect and predict which antenna panel may be affected and thus may directly declare BFD without going through a long and expensive detection procedure. Disclosed herein are apparatus and methods for detecting beam failure earlier and terminating BFD earlier than the current DFD process would have. The method may include identifying a beam failure (BF) event at the UE that impacts at least one beam pair link (BPL) and communicating a request to an associated base station to stop communicating on an impacted beam pair link affected, without going through a beam failure detection (BFD) process and/or without measuring at least one of a RSRP/SNR/SINR of a BFD reference signal (RS) received from the gNB for one of the at least one BPL.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
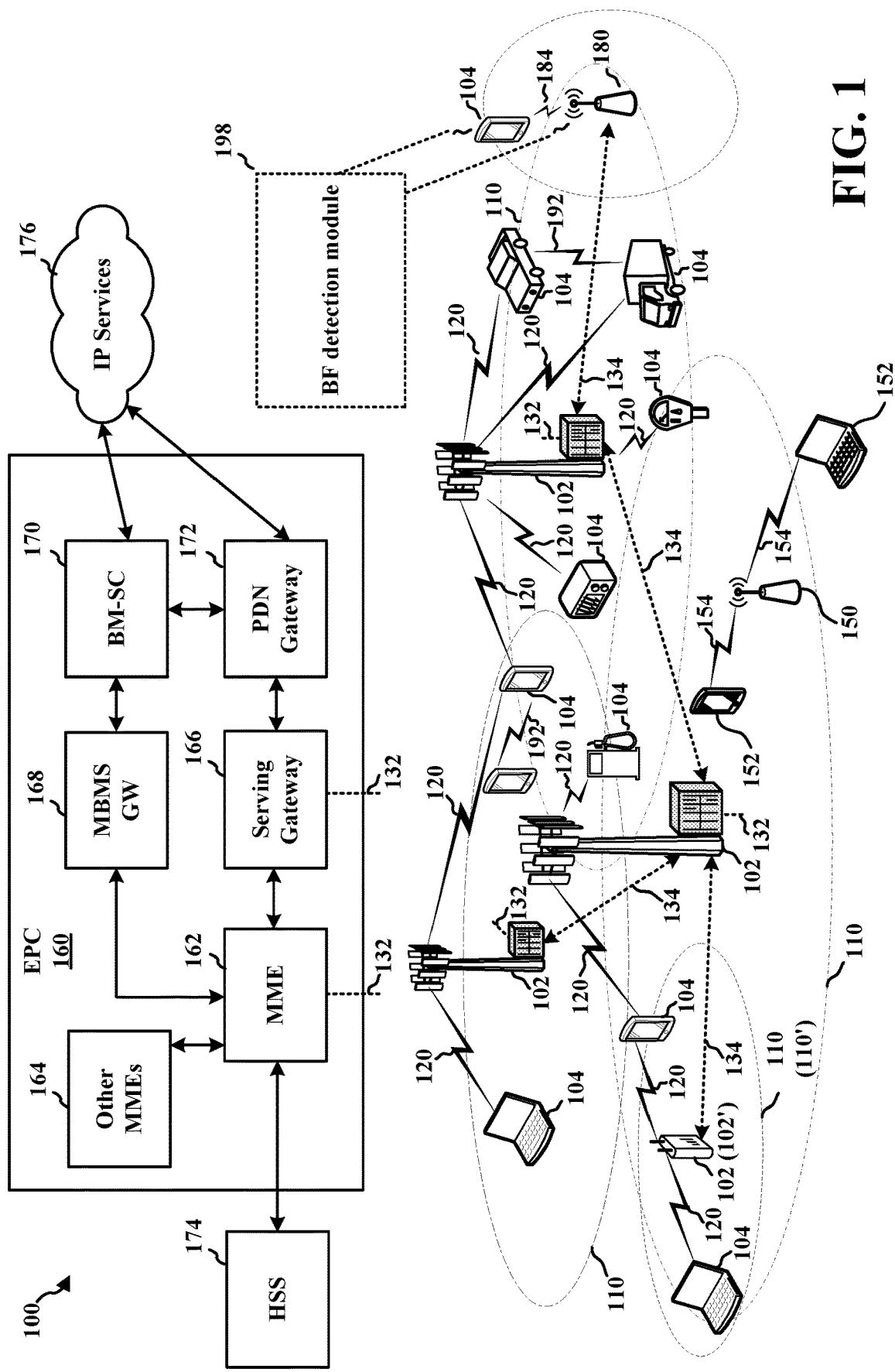
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNB 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/base station 180 may include a BF detection module (198) that is configured to detect and terminate BF detection early.

Figure 2:
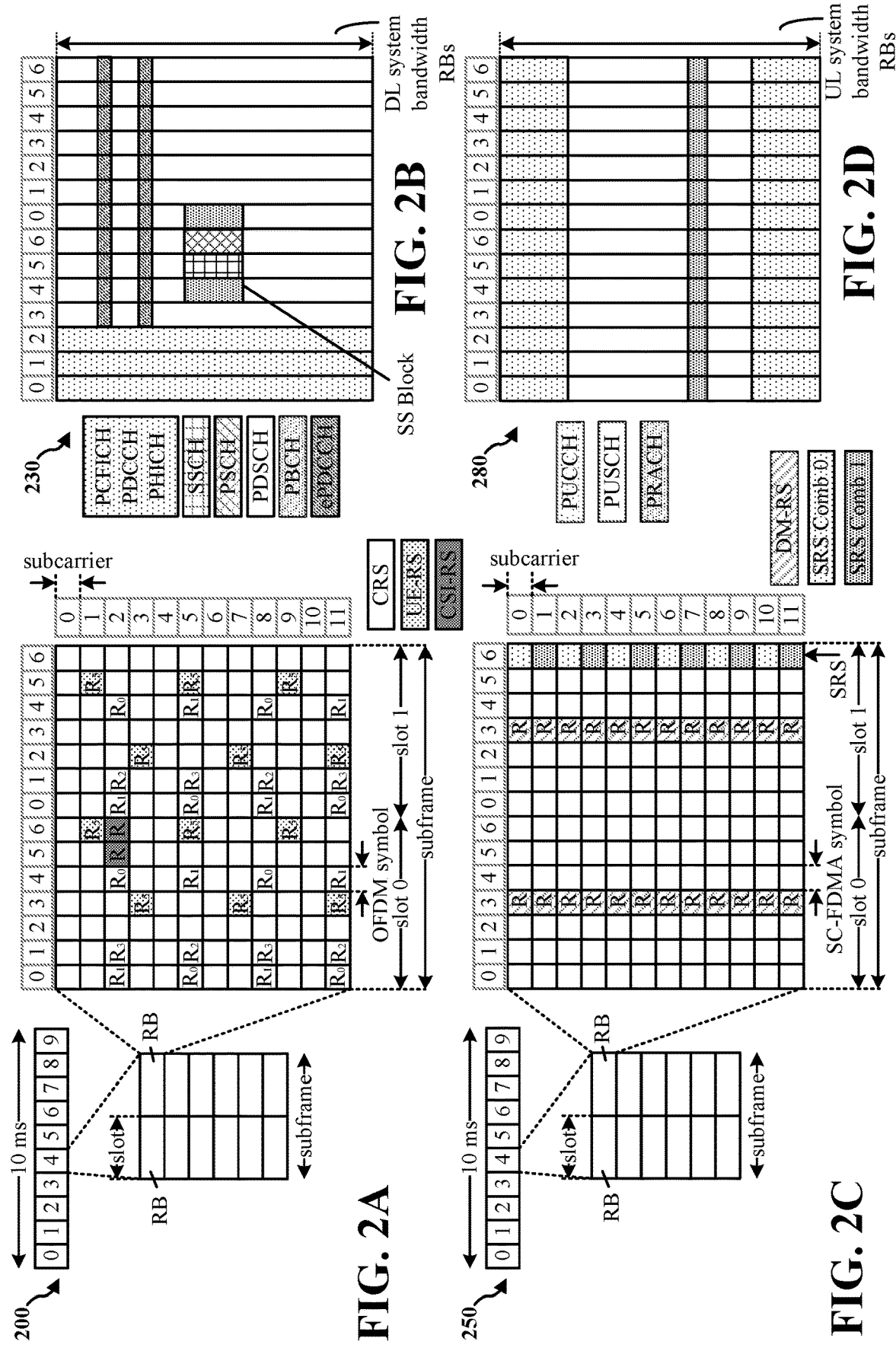
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DMRS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
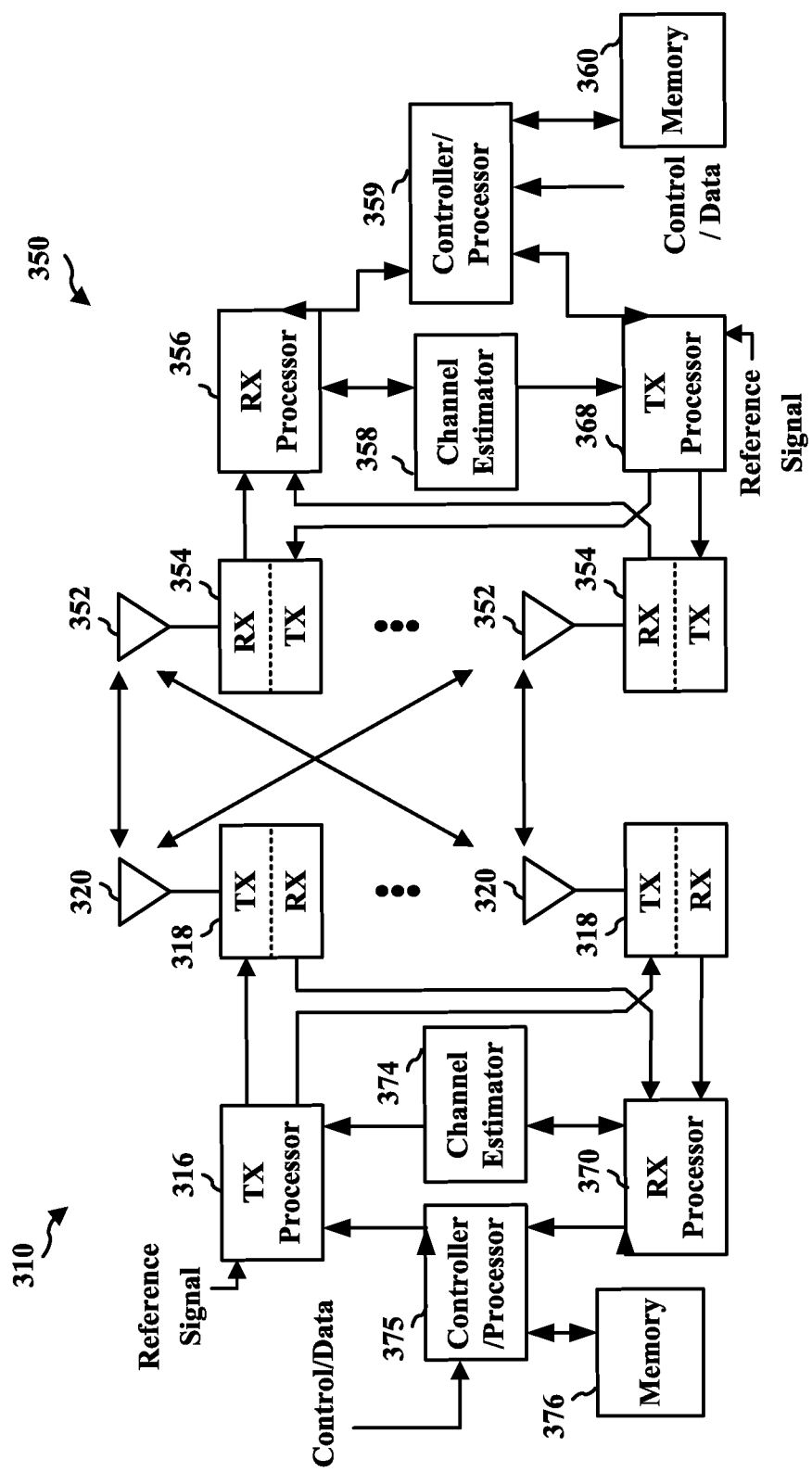
FIG. 3 is a diagram illustrating an example of a base station and user equipment (UE) in an access network in accordance with aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
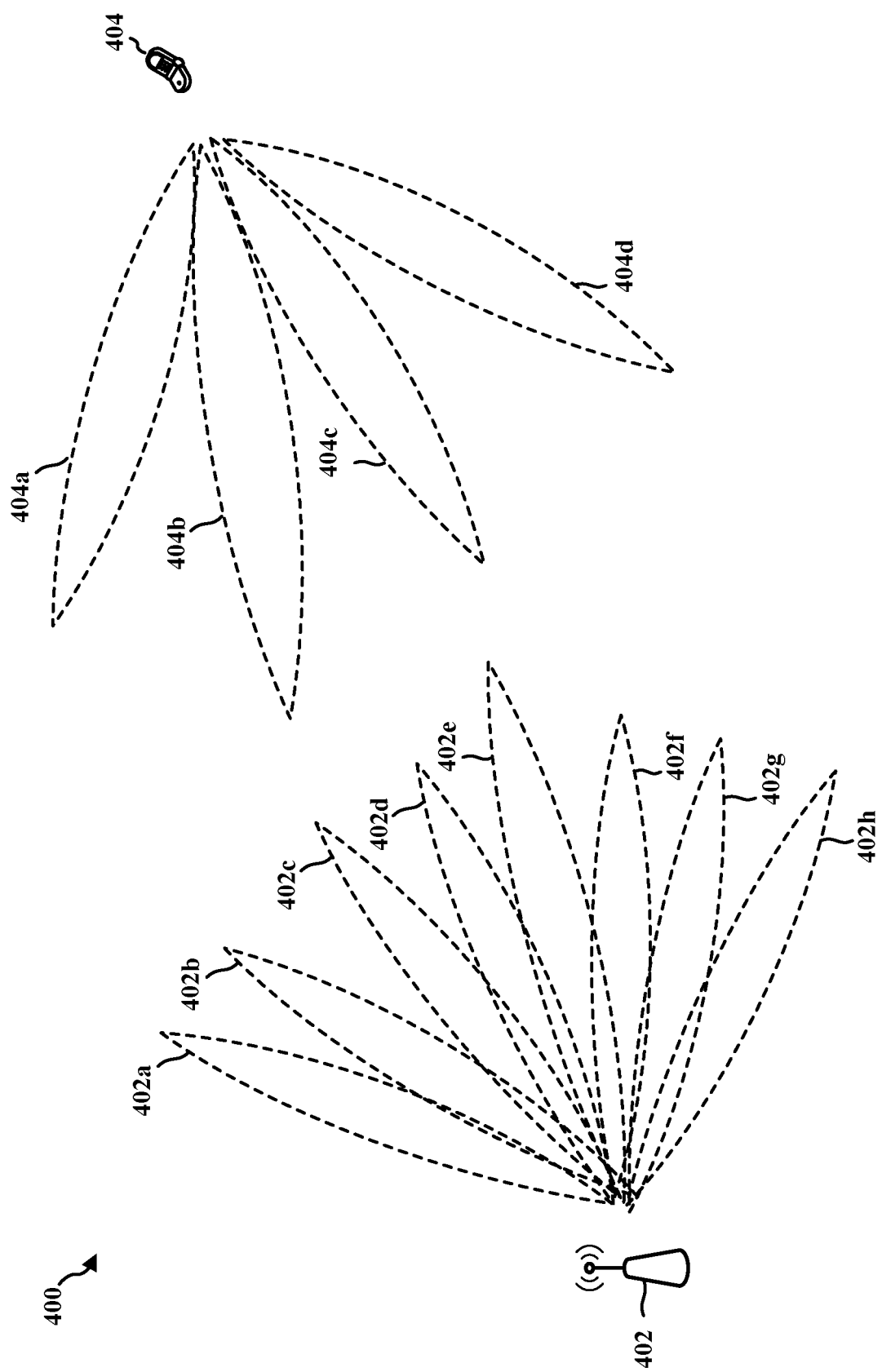
FIG. 4 is a diagram illustrating a base station in communication with a UE in accordance with aspects of the present disclosure.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same. The UE 404 may be a multi-panel UE configured to detect and terminate BF detection early.

Figure 5:
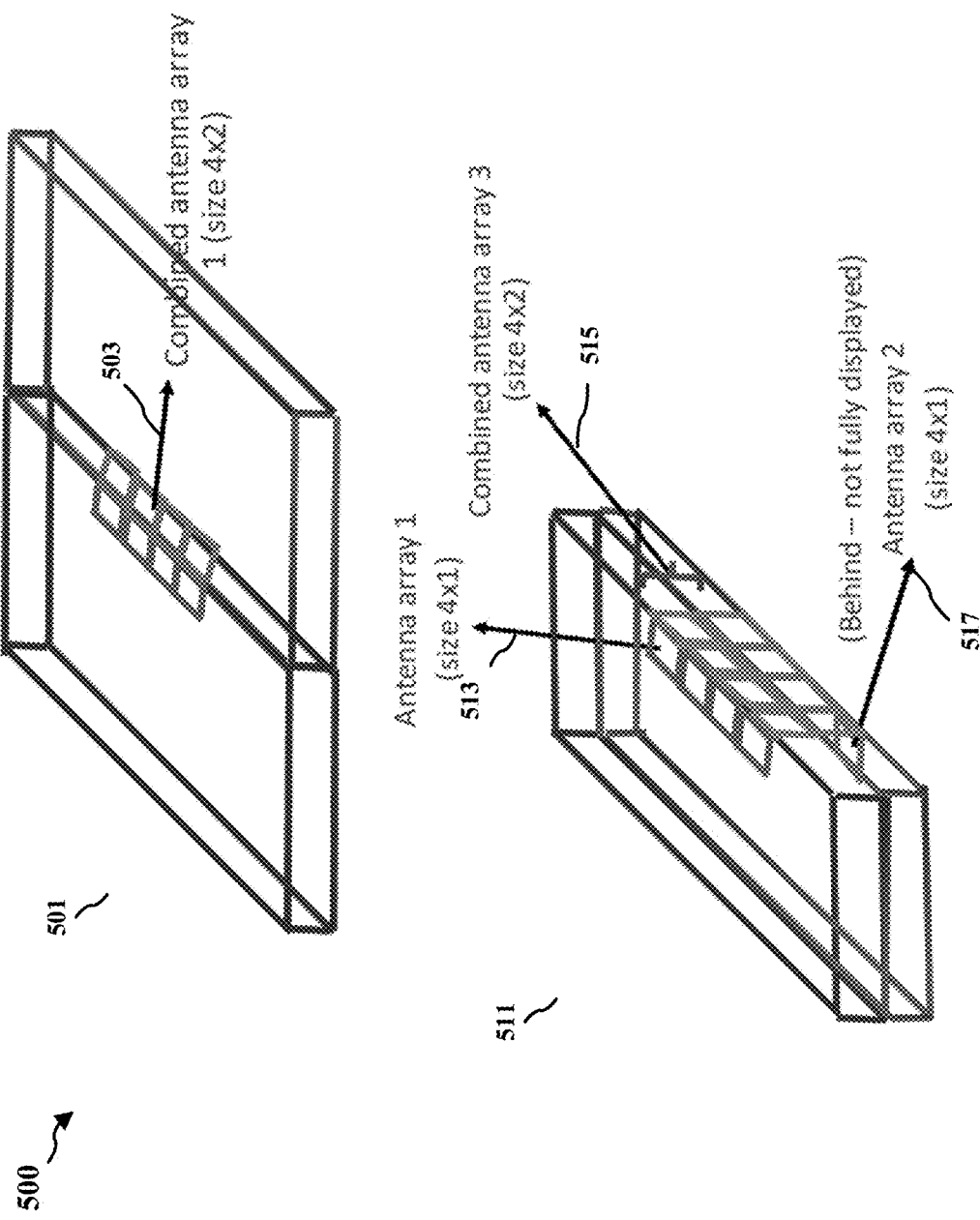
FIG. 5 illustrates an example BF event in accordance with aspects of the present disclosure.

FIG. 5 is a diagram illustrating an example UE display 500. The UE display 500 has two display arrangements 501 and 511. The arrangement 501 shows the display with an 4×2 antenna array/panel 503, in a flat, unfolded arrangement. The display arrangement 511 show the UE display in a folded arrangement with three antenna arrays 513, 515, and 517 respectively. The antenna array 513, a 4×1 antenna penal, remains available after the folding of the display. The combined antenna array 515, a 4×2 antenna panel, remain largely available, but the array configuration may have changed due to the event of the UE display folding, which may result in changes of antenna size and beamforming gain. The antenna array 517, a 4×1 antenna panel, which is not fully displayed in FIG. 5, may be hidden inside the folded display and at least some of the antenna elements may be shut down and become unavailable, as a result of the display folding.

FIG. 5 illustrates that a BF event like UE display folding may cause some antenna array of the UE be reconfigured and some antenna panel be shut down, some other panel be activated. The UE display folding may also cause some beam pair links on the impacted antenna panels be reconfigured or/and its size and beamforming gain changed. Accordingly, the BF event like UE display folding may cause changes in received signal quality.

Figure 6:
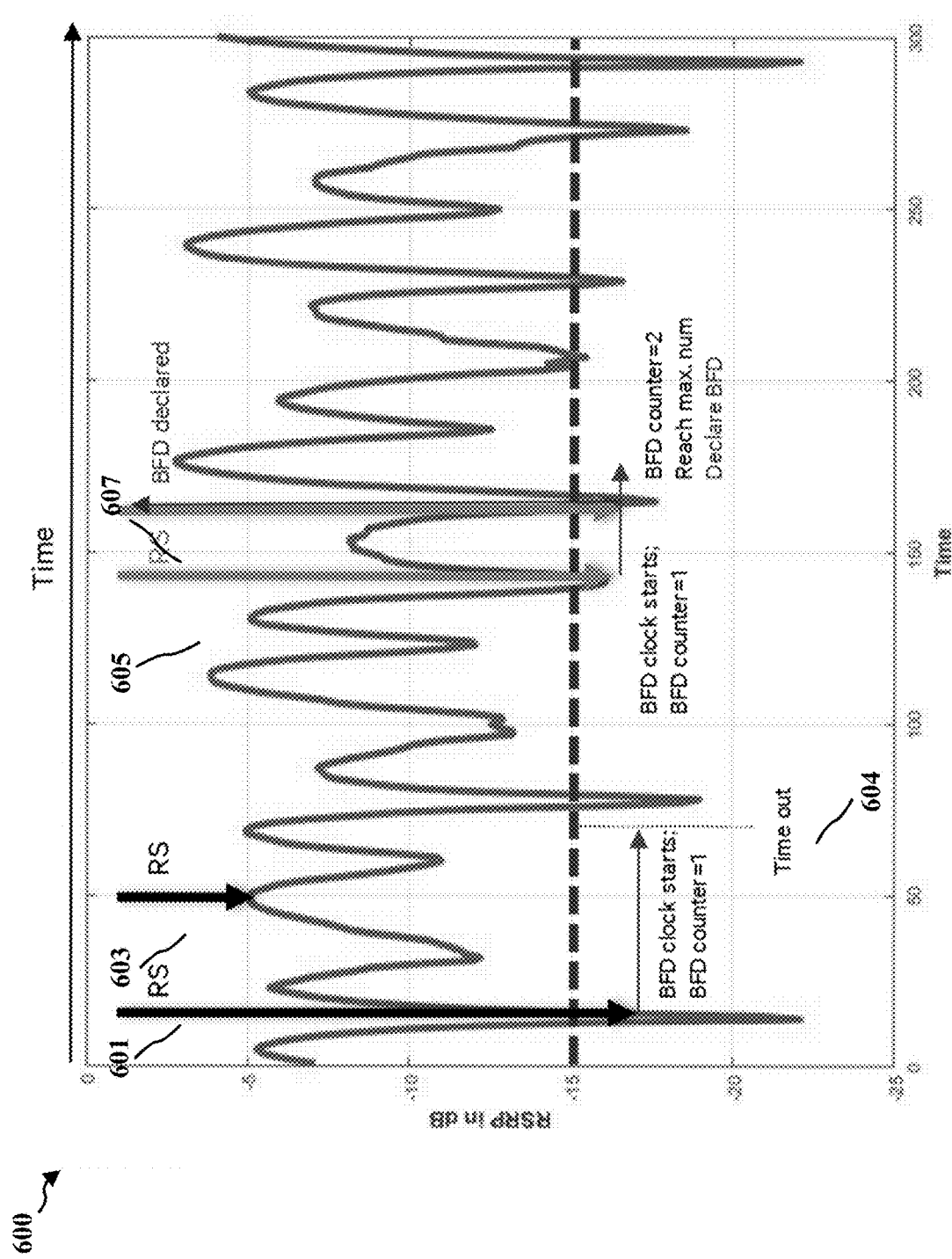
FIG. 6 is a diagram illustrating an example beam failure detection (BFD) process in accordance with aspects of the present disclosure.

FIG. 6 is a diagram illustrating an example beam failure detection (BFD) process 600. The BFD process 600 may include several steps, involving a UE and an associated base station. In general, the base station may send a reference signal (RS) to the UE to monitor link quality such as RSRP of a monitored BPL. The UE sends back the measurement results to the base station. The base station, based on the measurement results, may make a decision on whether to switch the current beam pair.

The UE may monitor the RSRP of RS on the BPL to detect a beam failure. The BFD process 600 illustrate a BF detection and confirmation process. There may be a predefined maximum number of beam failures that needs to be reached and a BFD clock that needs to expire before declaring a BF detection, in order to avoid frequent BF declarations due to short-term variations. As shown in FIG. 6, when the UE detects a RS quality degradation/RS signal failure at 601, the UE starts a BFD clock and a BFD counter. At 603 a new RS signal is measured, and the quality is above a predefined threshold. Thus, no RS signal failure is detected and when the BFD clock expires at 604, no more RS signal failure is detected, and the maximum BFD counter is not reached. Thus, no BFD is declared.

Then when a RS failure is detected at 605, the BFD clock and the BFD counter are both started again. Before the BFD clock times out, another RS signal failure is detected at 607 and the maximum BFD counter (2) is reached. Then a BFD is declared at 607.

The above BF detection and declaration process can potentially be lengthy and costly for the UE in terms of battery power and resources. The process is mainly designed for BFs due to external causes such as UE mobility, dynamic blockage, signal fading, etc. In general, a UE does not have any knowledge or control over the external causes. In contrast, those BFs due to actions initiated by the UE, the UE may be able to detect a BF event earlier and faster, and even predict the impact on a specific antenna panel and BPLs, without going through a lengthy process of BFD confirmation and declaration as shown in FIG. 6.

Figure 7:
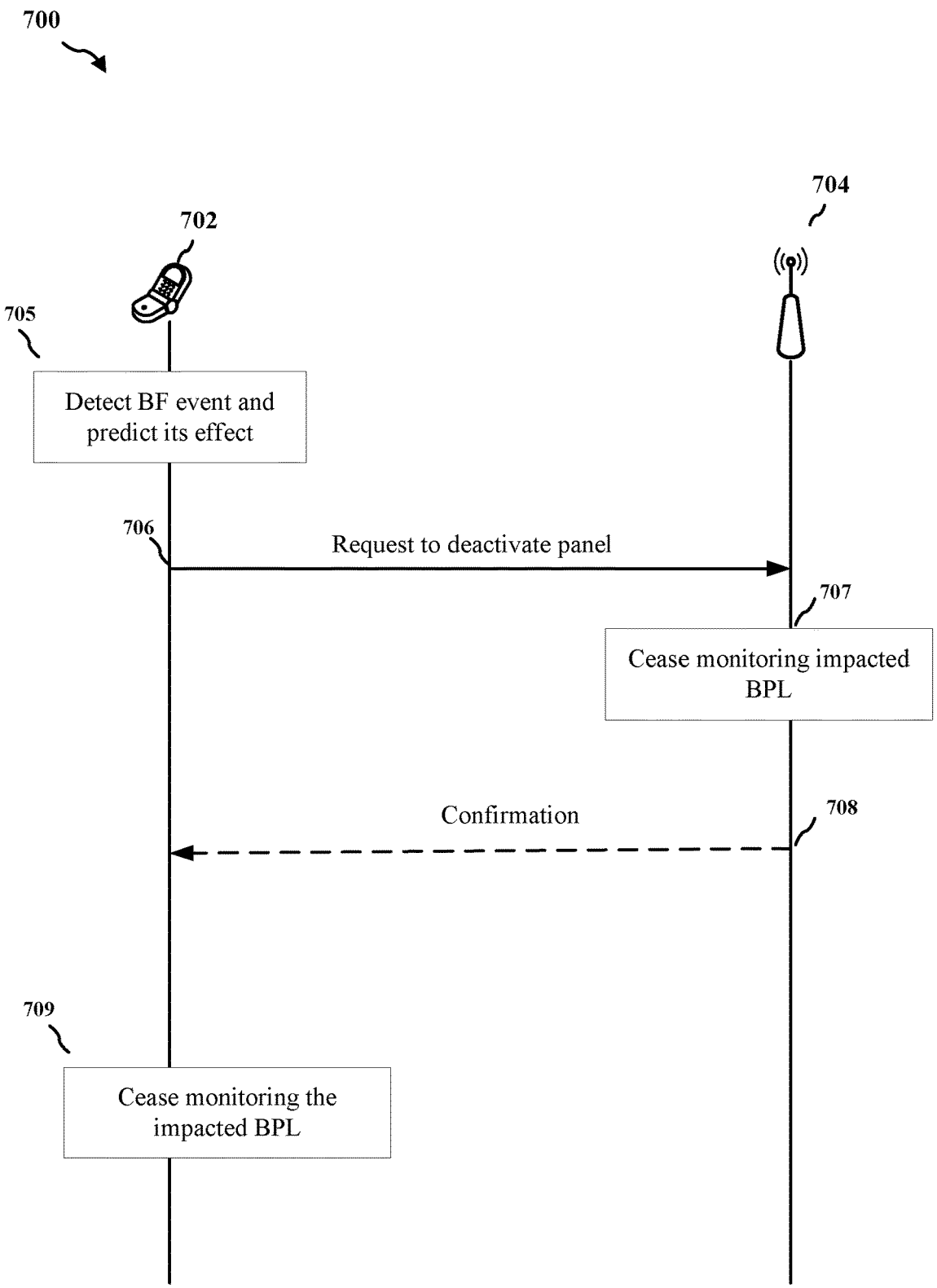
FIG. 7 is a diagram illustrating example message flow between a NR 5G base station and a multi-panel UE, in accordance with aspects of the present disclosure.

FIG. 7 is a diagram illustrating example message flow 700 between a base station and a multi-panel UE, in accordance with aspects of the present disclosure. The message flow 700 illustrates an example message exchange for detection of a beam failure caused by an internal event such as a display folding at the UE. The base station 704 may be a NR 5G gNB and the multi-panel UE 702 may be a 5G-capable UE with multiple antenna panels. A dotted line indicates the associated step may be optional.

At block 705, the UE 702 may detect and predict a BF caused by an event initiated by the UE itself, such as UE display folding. The UE may have multiple sensors, including a gyroscope sensor that is configured to detect a beginning of the display being folded. Once the UE is reasonably certain of the display folding event, the UE may predict the impact or effect of the event on the antennal panels. For example, the UE may determine which of the multiple panels will become unavailable and which will remain functional once the folding event is finished, based on the detected angle and movement of the display folding.

At block 706, upon detecting the BF event and predicting the impact of the event, the UE sends a request to the base station. The request at least informs the base station of the affected panel(s) and may request that the base station refrain from communicating/scheduling a transmission to the UE using the impacted BPL associated with the antenna panel (ID) or cease monitoring a BLP associated with the panel. Based on detecting of the event initiated by the UE and predicted impact of the event, the UE may directly send a request to the base station to terminate the BFD early, without going through a potentially lengthy and costly BFD process. The request sent to the base station may include various information, to be discussed in details later.

At block 707, upon receiving the request from the UE, the base station becomes aware which of the UE panel(s) has become unavailable for communications due to the detected BF event. The base station may then cease monitoring the impacted BLP associated with the panel and refrain from using any of these panels in communications with the UE. The base station may determine alone or in collaboration with the UE a replacement beam pair link (BPL) for the impacted BPL.

At block 708, upon stop monitoring a BLP associated with the panel, the base station send a confirmation message to the UE to confirm the actions taken at the base station side. The confirmation message may also include other information, such as a replacement BPL.

At block 709, the UE, upon receiving the confirmation message from the base station, may deactivate the impacted panel(s) at the UE side and stop monitoring the impacted BPLs as well, at least to conserve the power of beam measurements and beam monitoring. The UE may also take some other actions, such activating the replacement BPL for communications with the base station.

Although the message flow 700, as described herein, as an example, is applied to a UE-base station scenario where the UE detects a BF event and sends a request to a base station to cease monitoring an impacted panel and BPL, the message flow 700 is also applicable to other scenarios, including but are not limited to UE-UE and backhaul network scenarios. In the UE-UE scenario, a UE may detect a BF event and sends a request to a peer UE to stop monitoring an impact BPL. In the backhaul network scenario, one backhaul network node may detect a BF event and sends a request to another backhaul network node to stop monitoring an impacted BPL.

As indicated above, FIG. 7 is provided merely as an example. Other examples with different message flow sequences are possible and may differ from what is described with regard to FIG. 7 but are still within the spirit of the current disclosure.

Figure 8:
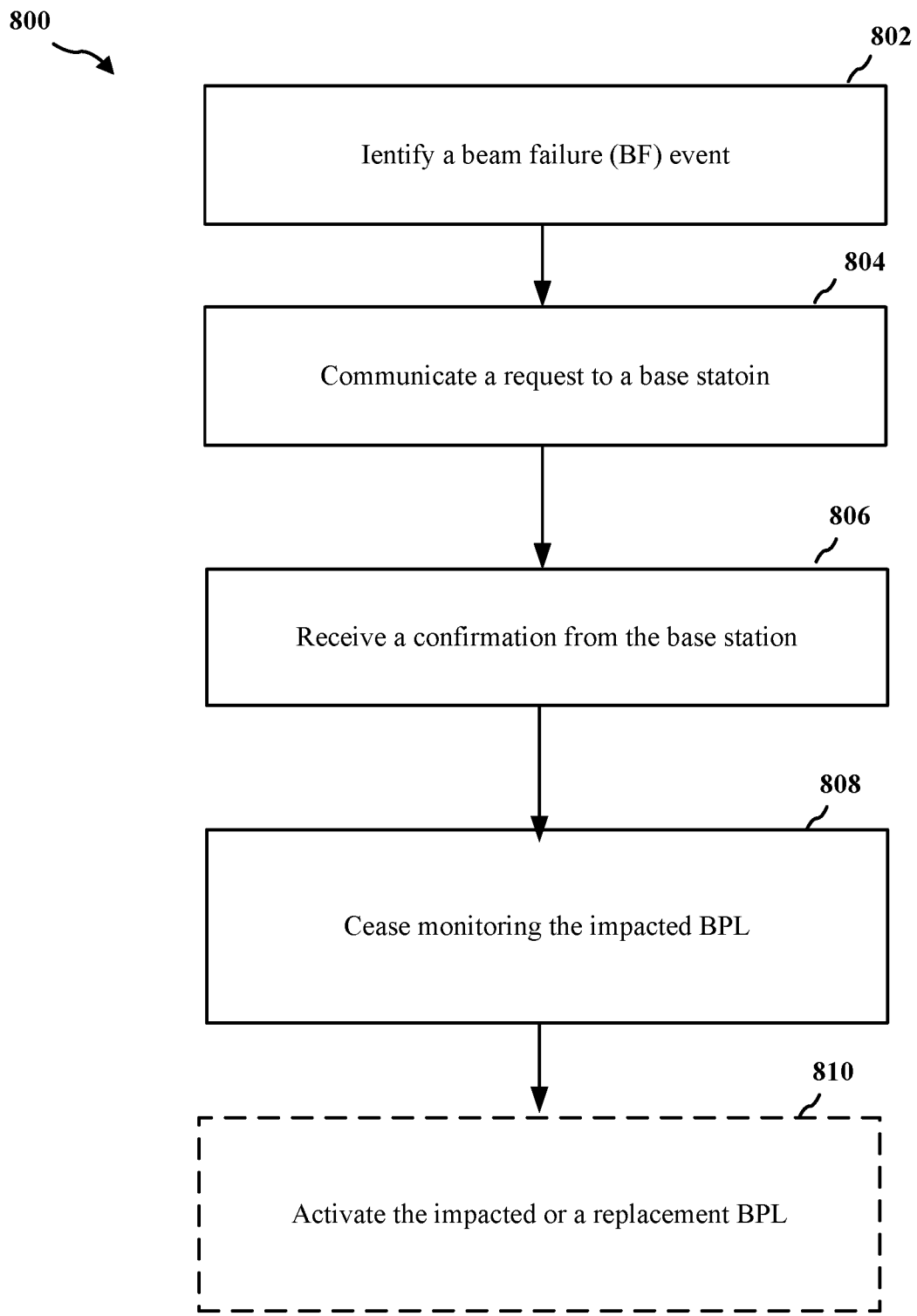
FIG. 8 is a flowchart of a method of wireless communication in accordance with various aspects of the present disclosure.

FIG. 8 is a flowchart of a method 800 of wireless communication, illustrating in accordance with various aspects of the present disclosure. The method 800 implements a process for a UE with multiple panels to detect a BF event and predict its impact on BPLs currently in service. The method 800 may be performed by a UE such as the UE 702 of FIG. 7 or any of the UE 120s of FIG. 1. The optional steps are indicated in dotted lines.

At 802, the method 800 includes identifying beam failure event at the UE. In one example aspect, the UE may detect a beginning of a BF event initiated by the UE such as folding of the UE display. Another example of the UE initiated BF event may be that UE shuts down certain antenna panel to conserve battery power under some circumstances.

Another UE-initiated BF event is tuning down transmission power for a panel to meet the regulatory requirement of a maximum permissible exposure (MPE). The UE may tune down the transmission power on an antenna panel for the MPE concern. If the adjusted power can not meet the link budget requirement, the UE may switch to another panel for transmission. In this case, the BF event may impact only the transmission function on the panel, while the receiving function of the panel is not impacted. In one example aspect, when the UE detects/predicts a human body moving close to the UE itself, the UE may initiate the BF event of tuning down the transmission power. The UE may then report to the base station the impacted transmission function for the impacted panel and BPL.

The UE may be configured with various sensors, including one or more gyroscope (gyro) sensors. For example, a gyro sensor may be configured to detect an angular velocity, that is, the change in rotational angle per second of the UE display movement and the UE may determine that the display is being folded based on the measured an angular velocity.

In one example aspect, the detecting of the BF event with a UE sensor comprises detecting at least a folding of the foldable display and detecting or predicting a configuration change of an antenna panel of the UE caused by the UE display folding. As depicted in FIG. 5 and described therein, a UE display folding may make unavailable some antenna panels.

In one example aspect, identifying the BF event may include determining the impacted beam pair links by identifying and/or predicting an impacted antenna panel, based in part on the predicted configuration change of the antenna panel. A UE sensor, such as a gyro sensor may detect a UE display folding event when the user just start folding the display. It may take a certain time period, such as a few slots, for the folding event to finish. As the BF event is in progress, the UE may predict its eventual impact on antenna panels. For example, based on the measured an angular velocity of the UE display, as described above, the UE may predict which antenna panel(s) will be impacted when the UE display folding is completed. Because the UE may have the knowledge of the BPLs on the impacted panel(s), the UE may also predict which BPLs will be impacted by the event as well. Additionally, in one example aspect, the UE may also predict how long it may take for the BF event to finish and thus how long the impacted BPLs will remain available.

At 804, the method 800 includes communicating a request to an associated gNB. The UE may send a request to the base station that the gNB ceases monitoring a BLP associated with the panel the affected antenna panel(s). In one example aspect, the request is carried on a carrier of a different frequency band that the current one in service and may be carried in a physical uplink control channel (PUCCH). In another example aspect, the request may be part of a regular schedule request included in an uplink control information (UCI) sent to the gNB.

In one example aspect, the request may include an identifier for the beam failure event, an impacted antenna panel identifier and the impacted BPL identifier, an indication of a time, a predicted time period for which that the BPL remains available, and a replacement BPL identifier identifying a recommended replacement BPL. The indication of a time may be a predicted time before the BPL becomes unavailable, or a predicted time period that the BPL will remain available.

In one example aspect, the identifier of the impacted one BPL may be associated with a transmission configuration indicator (TCI) state, an ID of a sounding reference signal (SRS) resource, a RS resource, and/or an assigned target RS resource or the identifier of the BPL is associated with a configuration of a RS, and the configuration may include some spatial relationship information linking the SRS resource with a RS resource. In one example aspect, there is a list of Transmission TCI states for dynamically indicating (over DCI) a transmission configuration which includes quasi co-located (QCL)-relationships between the DL RSs in one RS set and the PDSCH demodulation reference signal (DMRS) ports.

At 806, the method 800 includes receiving a confirmation from gNB in response to the request. The UE may receive the confirmation message from the gNB in response to the request sent at block 804. In one example aspect, the confirmation message may include an identifier of a replacement BPL that the gNB may determine to use, which may be same as or different from the replacement BPL that the UE recommends. The confirmation message may also include some other information, such as UE resource allocations for uplink or downlink communications with the UE.

At 808, the method 800 includes deactivating the impacted antenna panel(s) and ceasing monitoring the impacted BPLs. The UE may deactivate an impacted antenna penal from an active panel list, even though only some BPLs of the panel are in active service. The UE may also maintain an available BPL list to keep track all the BPLs currently in service for communications with the gNB. As result of deactivating the impacted antenna panel(s), the UE may also deactivate the impacted BPLs.

Additionally, at 808, UE may also cease monitoring the impacted BPLs. The UE may stop monitoring the link qualities of the impacted BPLs, include measuring for link RSRP, SNR and other measurement. Ceasing monitoring the impacted BPLs may also include stop sending any feedback to the gNB on the impacted BPLs.

At 810, the method 800 may optionally include activating the impacted antenna panel once the impacted antenna panel(s) has been restored to original state prior to the BF event. The BF event may be reverted. For example, the folded displayed may be unfolded back into the previous unfolded position. Additionally, the UE initiated BF event such as UE display folding may make some panel unavailable but some other previously unavailable panel available again. The UE may activate the previous unavailable panel that is made available again by the BF event.

In another example aspect, the method 800 may include communicating the request only after a timer expires since a previous request has been sent to the base station; and/or refraining from using the impacted BPL before a second timer has expired. This step is to prevent the UE from overusing or abusing the short-cut BFD that bypasses the potentially lengthy BFD process.

Although the method 800, as described herein, as an example, is applied to a UE-base station scenario where the UE detects a BF event and sends a request to a base station to cease monitoring an impacted panel and BPL, the method 800 is also applicable to other scenarios, including but are not limited to UE-UE and backhaul network scenarios. In the UE-UE scenario, a UE may detect a BF event and sends a request to a peer UE to stop monitoring an impact BPL. In the backhaul network scenario, one backhaul network node may detect a BF event and sends a request to another backhaul network node to stop monitoring an impacted BPL.

The method 800 is for illustration purpose and shows one possible process for a UE to detect a BF event and predict its impact without going through a formal BFD process, which may potentially be lengthy. In practice, one or more steps shown in illustrative flowchart for the method 800 may be combined with other steps, performed in any suitable order, performed in parallel (e.g., simultaneously or substantially simultaneously), or removed.

Figure 9:
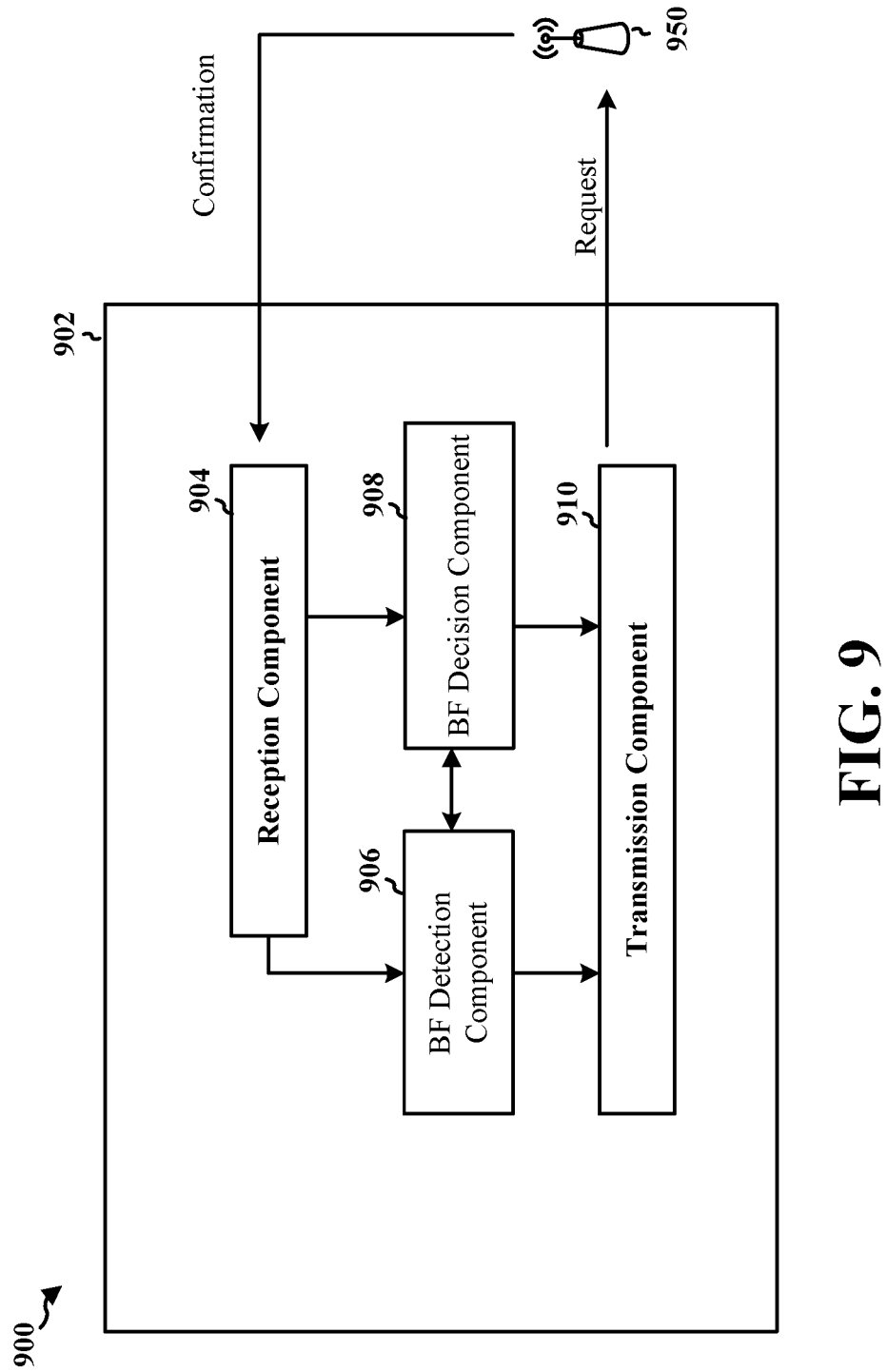
FIG. 9 is a conceptual data flow diagram illustrating the data flow between different means/components in an exemplary apparatus in accordance with aspects of the present disclosure.

FIG. 9 is a conceptual data flow diagram 900 illustrating the data flow between different means/components in an exemplary apparatus 902. The apparatus may be a UE. The apparatus includes a reception component 904 that receives a confirmation message from an associated gNB 950, a BF detection component 906 that may be configured with various sensors to detect a beginning of a UE-initiated event that may cause a beam failure, a BF decision component 908 that may determine whether a detected event is a "real" one that will lead to a beam failure or a "false alarm" and predict the impact of a detected real BF event, and a transmission component 910 that is configured to transmit at least a request to the gNB 950 to stop monitor one or more impacted BPLs associated with the panel.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
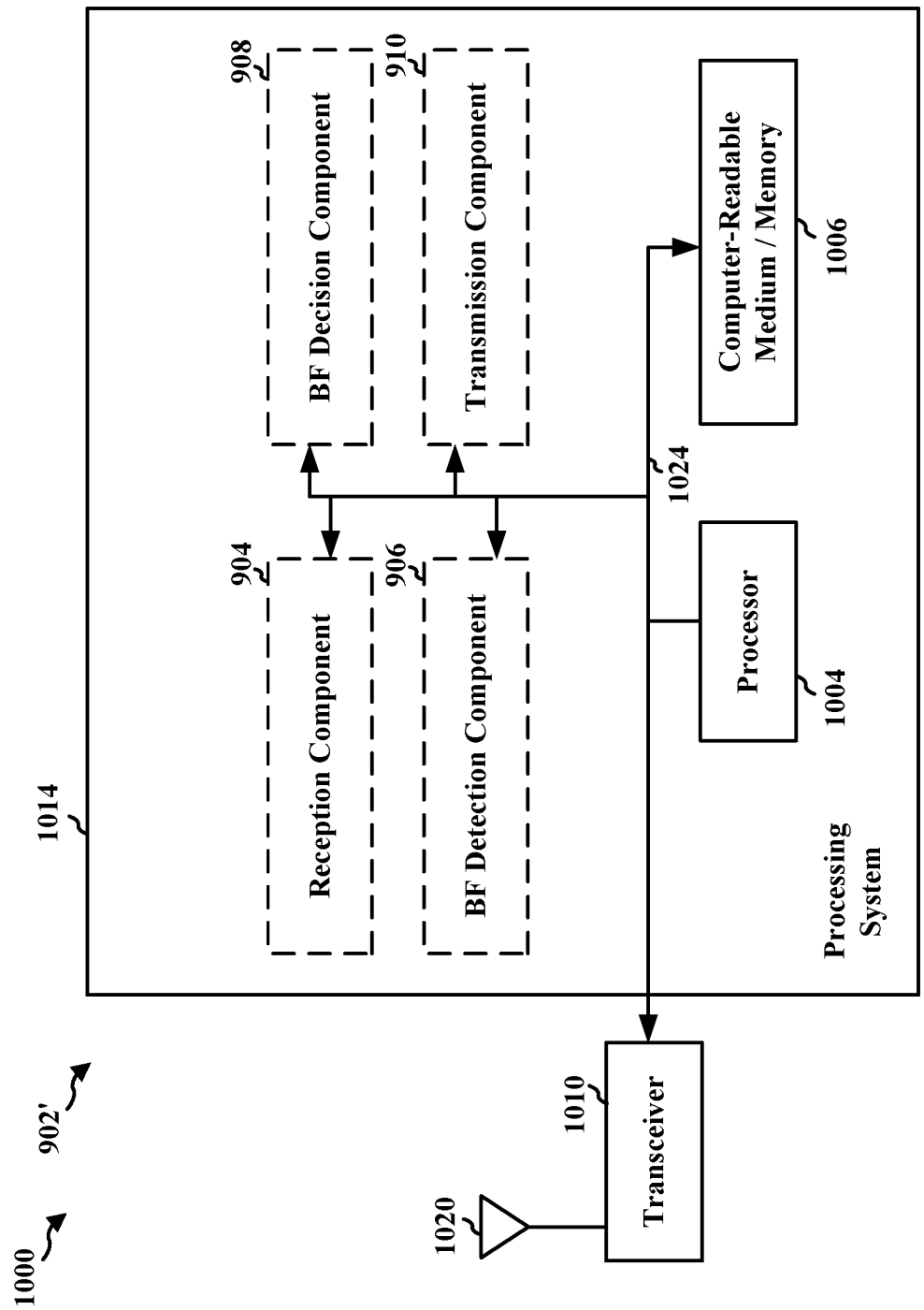
FIG. 10 is a diagram illustrating an example of a hardware implementation for an apparatus employing a processing system in accordance with aspects of the present disclosure.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, and 908 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 919, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, and 908. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for detecting an occurrence of a beam failure (BF) event, means for communicating a request to an associated generic NodeB (gNB), means for receiving a confirmation from the gNB, and means for ceasing monitoring the beam pair link. The aforementioned means may be one or more of the aforementioned components of the apparatus 1002 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
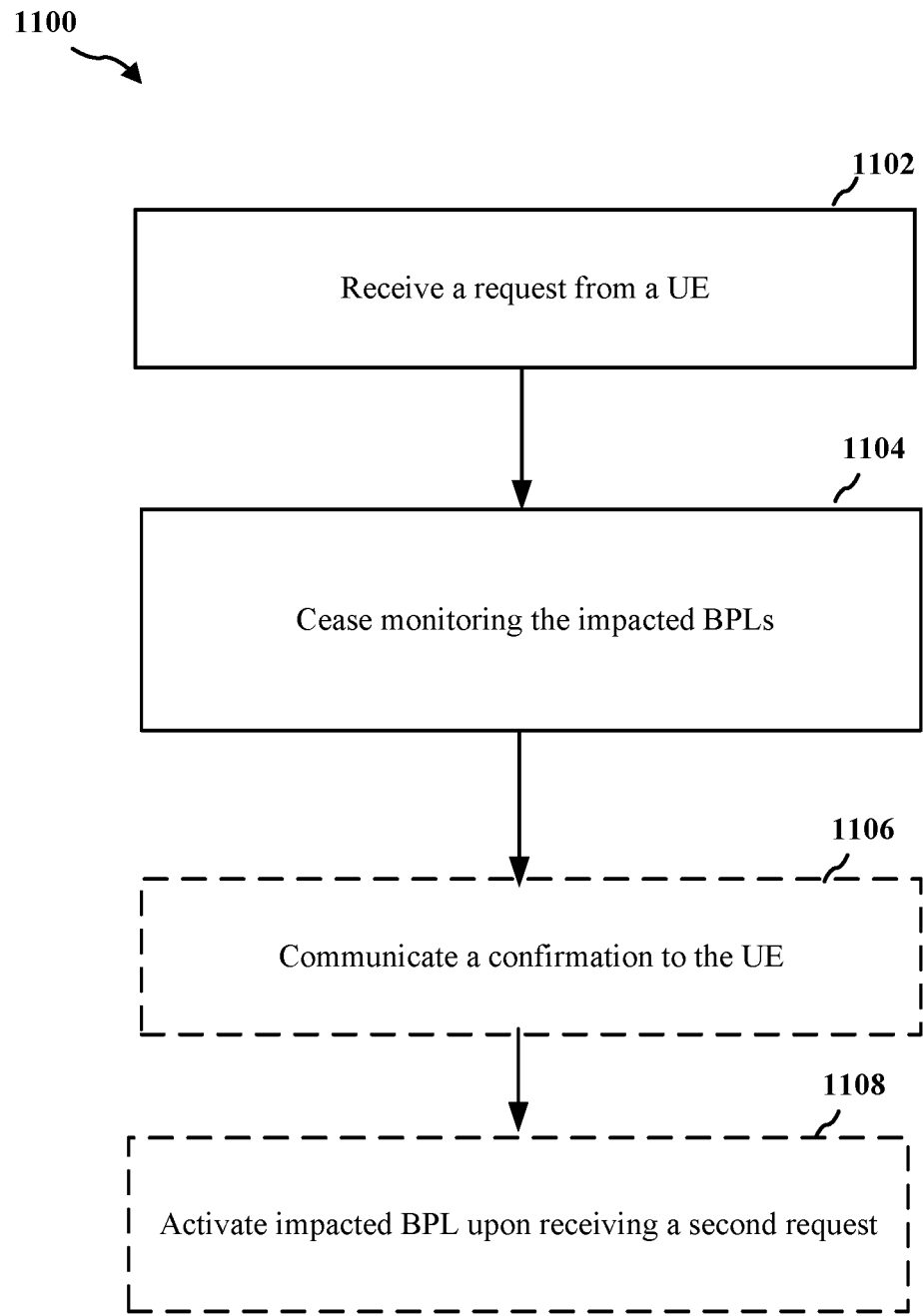
FIG. 11 is a flowchart of a method of wireless communication in accordance with various aspects of the present disclosure.

FIG. 11 is a flowchart of a method of wireless communication, illustrating method 1100 of wireless communication in accordance with various aspects of the present disclosure. The method 1100 implements a process for a base station in collaboration with a UE with multiple panels to detect a BF event and predict its impact on BPLs currently in service. The method 1100 may be performed by a base station such as the gNB 704 of FIG. 7 or any of the base stations 102s/180 of FIG. 1. The optional steps are indicated in dotted lines.

At 1102, the method 1100 includes receiving a request from the UE. The UE may send a request to the base station that the gNB gNB shall refrain from communicating/scheduling a transmission to the UE using the impacted BPL associated with the antenna panel (ID) or ceasing monitoring the BLP associated with the panel. In one example aspect, the UE may detect a beginning of a BF event such as folding of the UE display. The UE may be configured with various sensors, including one or more gyroscope (gyro) sensors. For example, the gyro sensor may be configured to detect an angular velocity, that is, the change in rotational angle per second of the UE display movement. In one example aspect, the detecting of the BF event with a UE sensor comprises detecting at least a folding of the foldable display and detecting or predicting a configuration change of an antenna panel of the UE caused by the UE display folding. As depicted in FIG. 5 and described therein, a UE display folding may make unavailable some antenna panels. When the UE is reasonably certain of the BF event, the UE sends the request to the gNB.

In one example aspect, the received request is carried on a carrier of a frequency band that is different from the one currently in service and may be carried in a physical uplink control channel (PUCCH). In another example aspect, the request may be part of a regular schedule request included in an uplink control information (UCI) received by the gNB.

In one example aspect, the request may include an identifier for the beam failure event, an impacted antenna panel identifier and the impacted BPL identifier, a predicted beam failure time, a predicted time period for which that the BPL remains available, and a replacement BPL identifier identifying a recommended replacement BPL.

In another example aspect, the impacted BPL identifier and the impacted antenna panel identifier may be associated with a synchronization reference signal (SRS) resource set ID, or a reference RS resource and/or resource set, or an assigned target RS resource or resource set. In another example aspect, the identifier of the impacted BPL identifier and the impacted antenna panel ID may be further associated with spatial relation information.

At 1104, the method 1100 includes ceasing monitoring the impacted BPLs. The base station is to refrain from communicating/scheduling a transmission to the UE via a BPL associated with the antenna panel (ID) or cease monitoring a BLP associated with the panel. In one example aspect, the gNB may "deactivate" or delete the impacted BPL from an active, available BPL list that the gNB maintains in the local memory. The gNB may maintain the active available BPL list to keep track of all active BPLs in service for communications with the UE.

Additionally, at 1104, the gNB may also cease monitoring the impacted BPLs. The gNB may stop monitoring the link qualities of the impacted BPLs, include measuring for link RSRP, SNR and other measurements. Ceasing monitoring the impacted BPLs may also include stop receiving any feedback from the UE on the impacted BPLs and stop all communications on the impacted antenna panel.

At 1106, the method 1100 includes communicating a confirmation message to the UE in response to receiving the request. The gNB may sent a confirmation message in response to the request received at block 1104. In one example aspect, the confirmation message may include an identifier of a replacement BPL that the gNB decides to use, which may be same as or different from the replacement BPL that the UE recommends. The confirmation message may also include some other information, such as UE resource allocations for uplink or downlink communications with the gNB.

At 1108, the method 1100 may optionally include activating the impacted antenna panel upon receiving a second request once the impacted antenna panel(s) has been restored to original state prior to the BF event. In one example aspect, "activating" here may mean that the base station restores the impacted BPL on the active available list. The BF event may be reverted. For example, the folded displayed may be unfolded back into the previous unfolded position. Upon reverting of the BF event to the previous state, the gNB may receive a second request to restore the deactivated/deleted BPLs in the active available BPL list and gNB may start monitoring/scheduling transmissions on the restored BPLs. Additionally, the UE initiated BF event such as UE display folding may make some panel unavailable but some other previously unavailable panel available again. The gNB may activate the previous unavailable panel that is made available again by the BF event, based on the received request.

Although the method 1100, as described herein, as an example, is applied to a UE-base station scenario where the UE detects a BF event and sends a request to a base station to cease monitoring an impacted BPL, the method 800 is also applicable to other scenarios, including but are not limited to, UE-UE and backhaul network scenarios. In the UE-UE scenario, a UE may detect a BF event and sends a request to a peer UE to stop monitoring an impact BPL. In the backhaul network scenario, one backhaul network node may detect a BF event and sends a request to another backhaul network node to stop monitoring an impacted BPL.

The method 1100 is for illustration purpose and shows one possible process for a gNB to assist the UE to detect a BF event and predict its impact without going through a formal BFD process, which may potentially be lengthy. In practice, one or more steps shown in illustrative flowchart for the method 1100 may be combined with other steps, performed in any suitable order, performed in parallel (e.g., simultaneously or substantially simultaneously), or removed.

Figure 12:
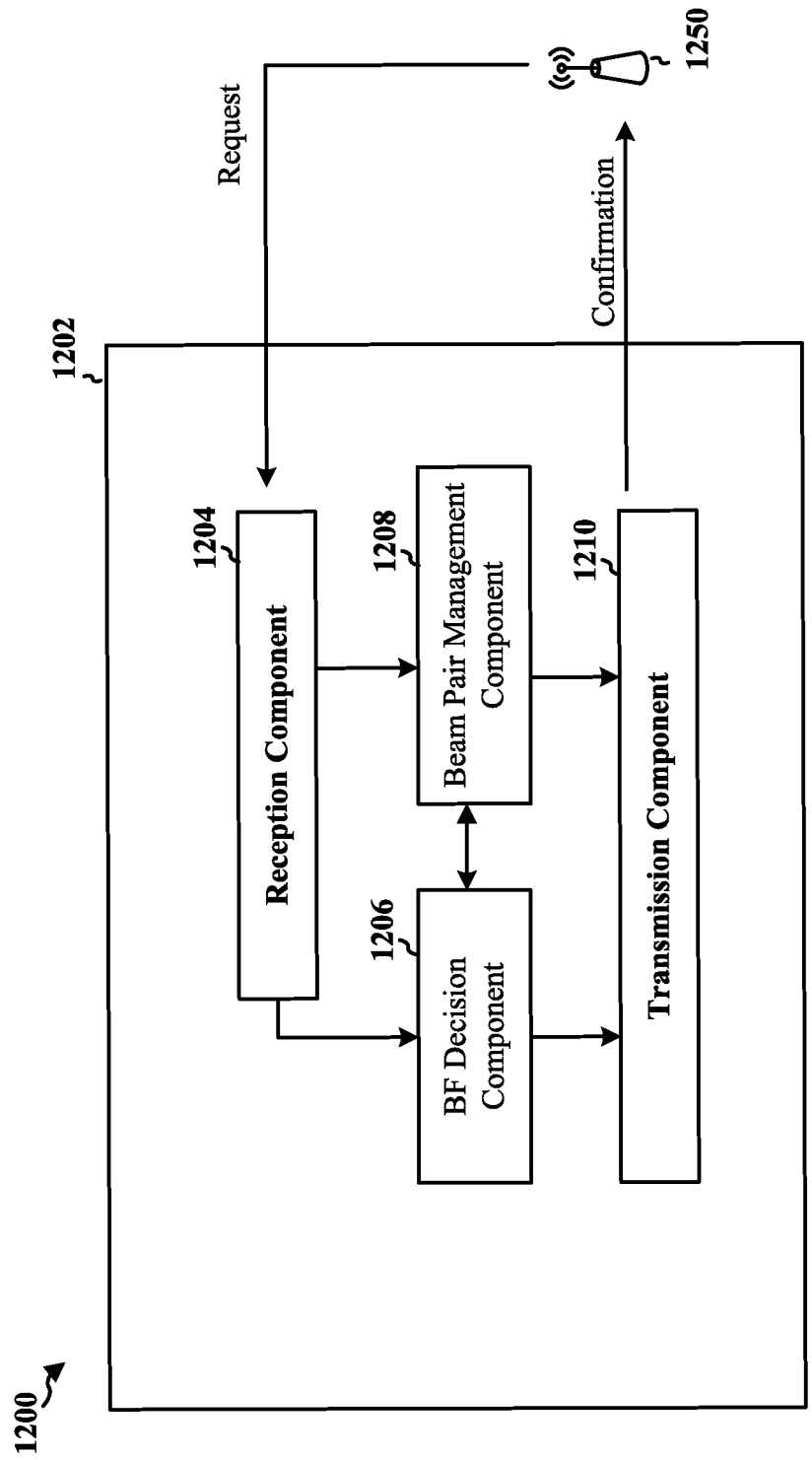
FIG. 12 is a conceptual data flow diagram illustrating the data flow between different means/components in an exemplary apparatus in accordance with aspects of the present disclosure.

FIG. 12 is a conceptual data flow diagram 1200 illustrating the data flow between different means/components in an exemplary apparatus 1202. The apparatus may be a gNB. The apparatus includes a reception component 1204 that receives a request from an associated UE 1250, a BF decision component 1006 that may determine the impact of an BF event that is reported in the request and actions to be taken at the gNB in response to the request, a beam pair management component 1208 that may stop monitoring impacted BPLs associated with an antenna panel and restart transmission using the restored or replacement BPLs and antenna panels, and a transmission component 1210 that is configured to transmit at least a confirmation message to the UE 1250 to confirm the actions that have been taken at the gNB side in response to the reported BF event.

The apparatus may include additional components that perform each of the blocks of the algorithm in the aforementioned flowcharts of FIGS. 7 and 11. As such, each block in the aforementioned flowcharts of FIGS. 7 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
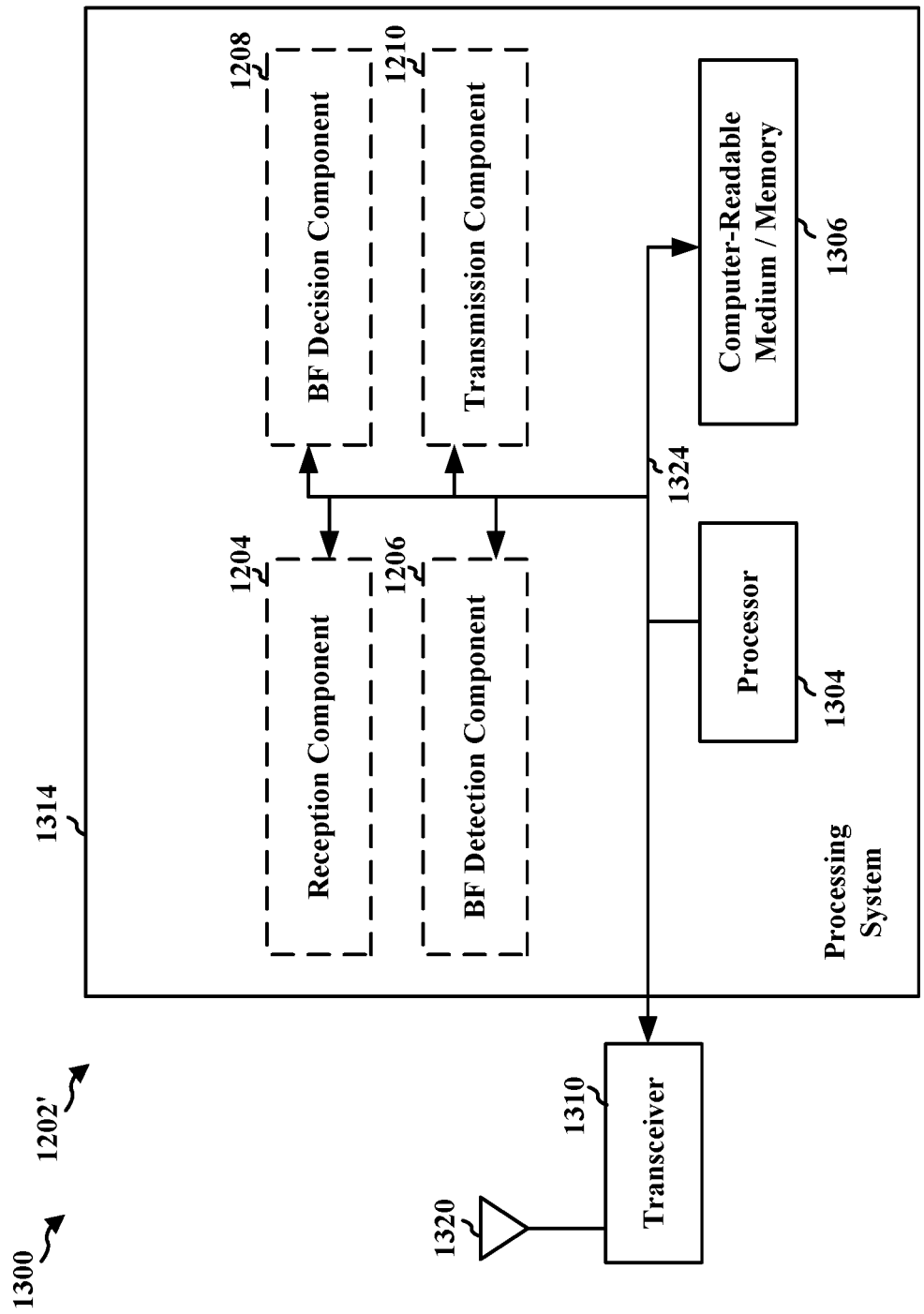
FIG. 13 is a diagram illustrating an example of a hardware implementation for an apparatus employing a processing system in accordance with aspects of the present disclosure.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, and 1210 and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, and 1210. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for receiving a request from a UE, means for ceasing monitoring an impacted antenna panel, and means for communicating a confirmation message, and means for activating impacted antenna panel upon receiving a second request. The aforementioned mans may be one or more of the aforementioned components of the apparatus 1202 and/or the processing system 1314 of the apparatus 1202' configured to perform the functions recited by the aforementioned means. As described supra, the processing system 1014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first wireless communication device, comprising:

identifying a beam failure (BF) event at the first wireless communication device that impacts at least one beam pair link (BPL); and communicating a request to a second wireless communication device to stop communicating on the at least one BPL, based on a configuration change of an antenna panel.

2. The method of claim 1, further comprising:

receiving a confirmation from the second wireless communication device in response to the request.

3. The method of claim 2, wherein the request indicates a time for the first wireless communication device to stop monitoring the at least one BPL and/or a time when the first wireless communication device does not expect any further transmission scheduled on the at least one BPL.

4. The method of claim 2, further comprising ceasing monitoring the at least one BPL in response to the confirmation from the second wireless communication device.

5. The method of claim 3, wherein the identifying the BF event comprises determining an identifier (ID) of the antenna panel, the antenna panel being associated with the at least one BPL.

6. The method of claim 5, further comprising:

ceasing monitoring a second BPL associated with the ID of the antenna panel.

7. The method of claim 1, wherein the identifying the BF event comprises detecting a relative position change of the first wireless communication device's components using a sensor of the first wireless communication device.

8. The method of claim 5, wherein the request comprises an identifier for the beam failure event,
    an identifier of the at least one BPL,
    an identifier of the antenna panel,
    an indication of a particular time,
    a predicted time period for which that the impacted BPL remains available,
    an indication of which of a transmission function and a receiving function of the impacted BPL is impacted by the BF event,
    a recommended BPL in place of the at least one BPL, or
    a combination thereof.

9. The method of claim 8, wherein the particular time comprises a predicted BF time or a time beyond which the first wireless communication device will cease using the at least one BPL for receiving or transmitting a signal.

10. The method of claim 1, wherein the request is carried on a carrier on a same or different frequency band than a current frequency in service and/or in a physical uplink control channel (PUCCH) or a schedule request sent to the second wireless communication device.

11. The method of claim 8, wherein the identifier of the at least one BPL is associated with a transmission configuration indicator (TCI) state, an antenna panel ID, an ID of a sounding reference signal (SRS) resource, a reference signal (RS) resource, and/or an assigned target RS resource or wherein the identifier of the at least one BPL is associated with a configuration of a RS.

12. The method of claim 11, wherein the configuration of the RS indicates spatial relationship information linking the RS resource with an RS resource or an antenna panel ID.

13. The method of claim 1, further comprising communicating the request only after a timer expires since a previous request has been sent to the second wireless communication device; and/or refraining from using the at least one BPL before a second timer has expired;

wherein one of the first wireless communication device and the second wireless communication device comprise one of a user equipment, a base station, and a backhaul network node.

14. An apparatus for wireless communications implemented at a first wireless communication device, comprising
a transceiver;
a memory; and
at least one processor coupled to the memory and configured to: identify a beam failure (BF) event at the first wireless communication device that impacts at least one beam pair link (BPL); and
communicate a request to a second wireless communication device to stop communicating on the at one BPL, based on a configuration change of an antenna panel.

15. The apparatus of claim 14, wherein the at least one processor is further configured to:
receive a confirmation from the second wireless communication device in response to the request;
cease monitoring the at least one BPL in response to a confirmation from the second wireless communication device; or
a combination thereof.

16. The apparatus of claim 14, wherein the request indicates a time for the first wireless communication device to stop monitoring the at least one BPL and/or a time when the first wireless communication device does not expect any further transmission scheduled on the at least one BPL.

* * * * *